(12) United States Patent
Kawano et al.

(10) Patent No.: US 7,887,947 B2
(45) Date of Patent: Feb. 15, 2011

(54) CONNECTION STRUCTURE BETWEEN UNIT CELLS

(75) Inventors: Hiroshi Kawano, Osaka (JP); Isao Matsumoto, Osaka (JP); Keisuke Aoki, Osaki (JP); Yoshimitsu Hiroshima, Osaka (JP); Hiroshi Narusawa, Osaka (JP)

(73) Assignee: M&G Eco-Battery Co., Ltd., Osaka-shi (JP)

( * ) Notice: Subject to any disclaimer, the term of this patent is extended or adjusted under 35 U.S.C. 154(b) by 1082 days.

(21) Appl. No.: 11/645,784

(22) Filed: Dec. 26, 2006

(65) Prior Publication Data
US 2007/0184342 A1    Aug. 9, 2007

(30) Foreign Application Priority Data
Dec. 27, 2005    (JP)    ............... 2005-375324

(51) Int. Cl.
*H01M 2/24*    (2006.01)
*H01M 6/42*    (2006.01)
*H01M 6/46*    (2006.01)
*H01M 2/26*    (2006.01)
*H01R 24/00*    (2006.01)

(52) U.S. Cl. .............. 429/160; 429/121; 429/153; 429/154; 429/157; 429/158; 439/627

(58) Field of Classification Search ........... 429/121, 429/153–154, 156–160; 439/627
See application file for complete search history.

(56) References Cited

U.S. PATENT DOCUMENTS

| 4,077,268 | A | * | 3/1978 | Hill ..................... 74/424.71 |
| 4,746,220 | A | * | 5/1988 | Sukai et al. ............. 366/79 |
| 5,900,332 | A | | 5/1999 | Marukawa et al. |
| 6,844,110 | B2 | | 1/2005 | Enomoto et al. |
| 2001/0031393 | A1 | * | 10/2001 | Oda et al. ............... 429/158 |
| 2002/0086205 | A1 | * | 7/2002 | Payen et al. ............ 429/158 |
| 2005/0281611 | A1 | * | 12/2005 | Matczak ................. 403/122 |

FOREIGN PATENT DOCUMENTS

| DE | 494929 | C | | 3/1930 |
| GB | 108849 | A | | 2/1918 |
| JP | 08222201 | A | * | 8/1996 |
| JP | 10-106533 | A | | 4/1998 |
| JP | 2000-149907 | A | | 5/2000 |

OTHER PUBLICATIONS

Machine translation of JP 08-222201 (relied upon in rejection): Muta, Battery, Aug. 1996.*

* cited by examiner

*Primary Examiner*—Gregg Cantelmo
*Assistant Examiner*—Eugenia Wang
(74) *Attorney, Agent, or Firm*—The Webb Law Firm

(57) ABSTRACT

The connection structure between unit cells connects a plurality of batteries B1 and B2 in series with bottomed cylindrical battery cases 2 and 5 which function as electrode terminals on one side, sealing plates 3 which close the opening portions of the battery cases 2 and 5 which function as electrode terminals on another side, and the first ring 1a with a flange is conductively connected at a bottom portion of a battery case 2 of one battery B1, the second ring 1b with a flange is conductively connected at an upper portion of the sealing plate 3 of another battery B2, and the first ring 1a and the second ring 1b are fitted.

16 Claims, 6 Drawing Sheets

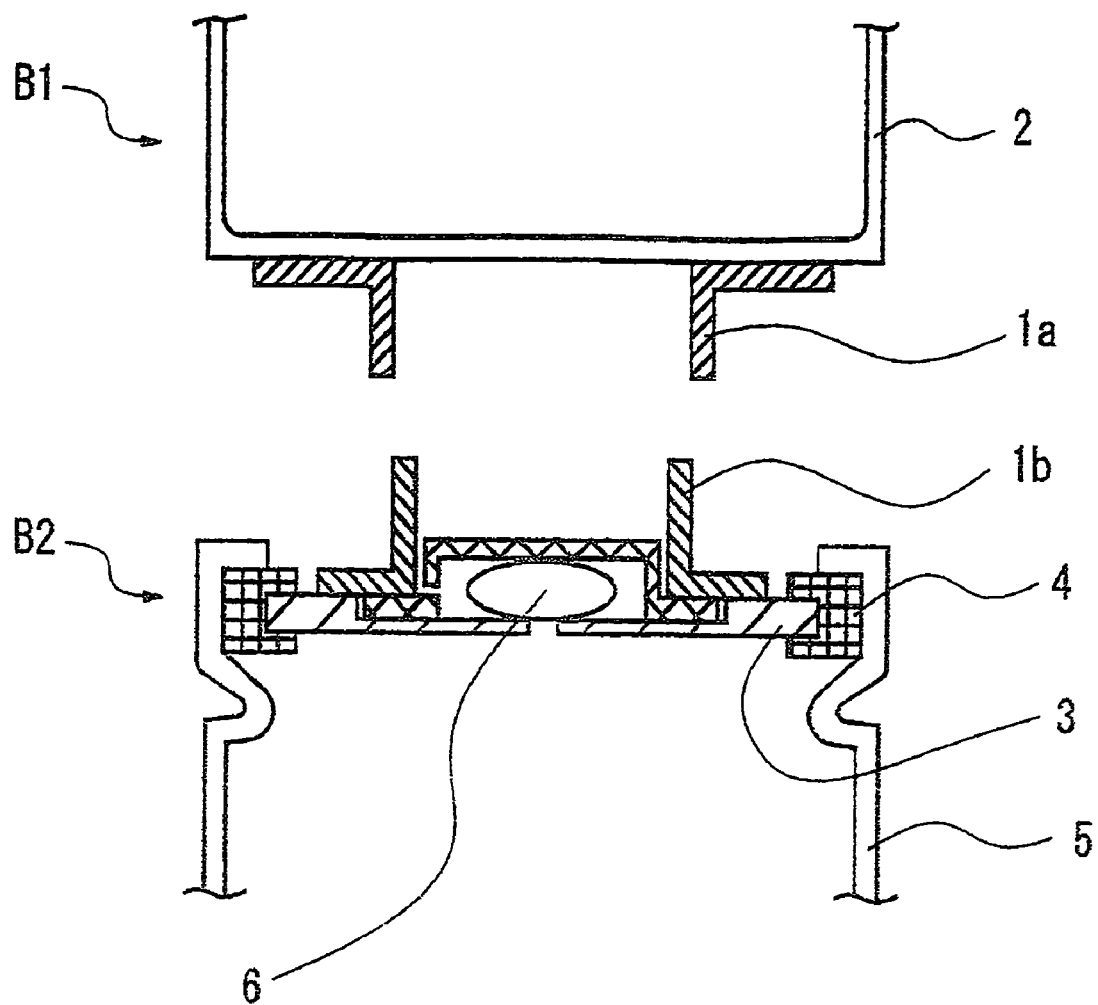
[FIG.1]

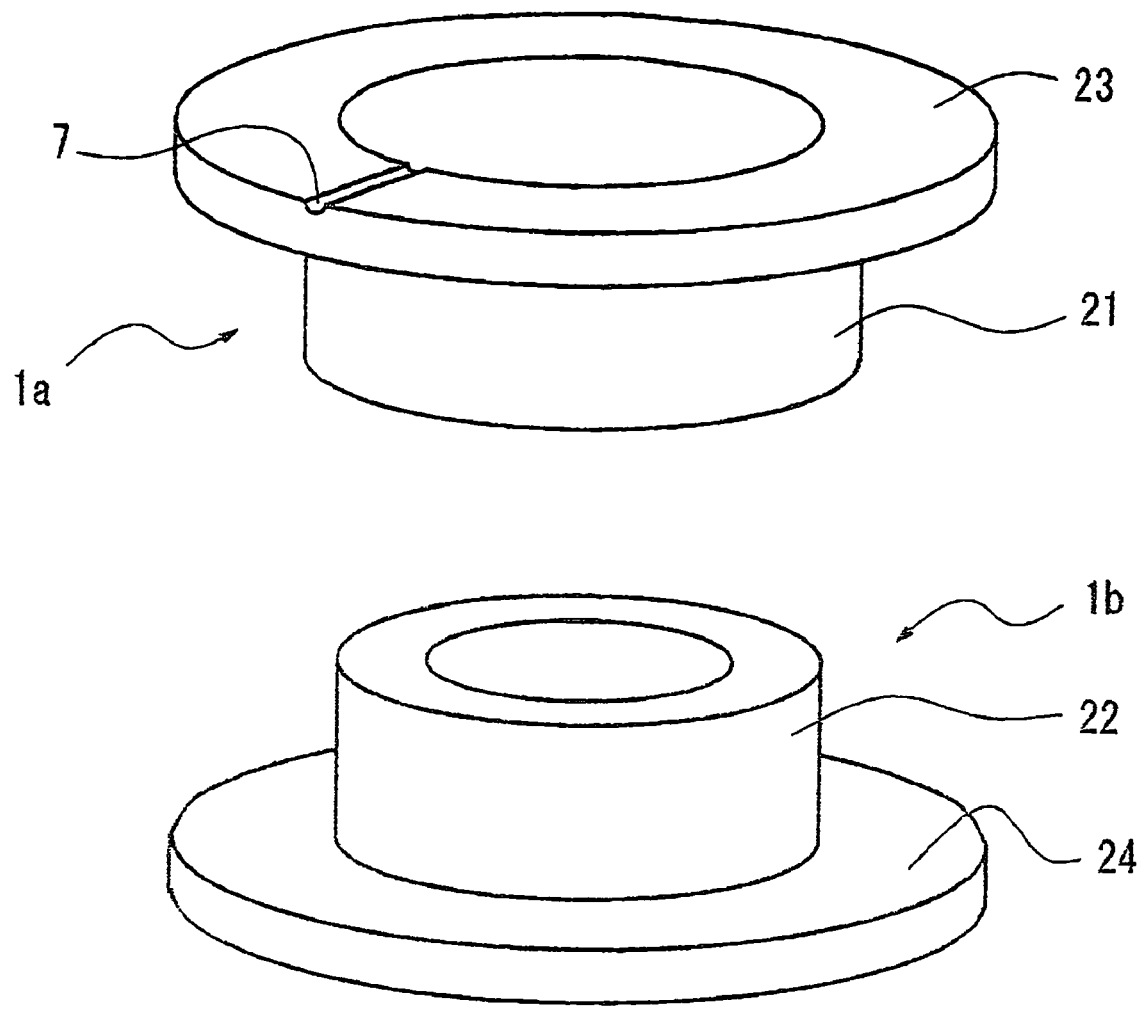

[FIG.4]
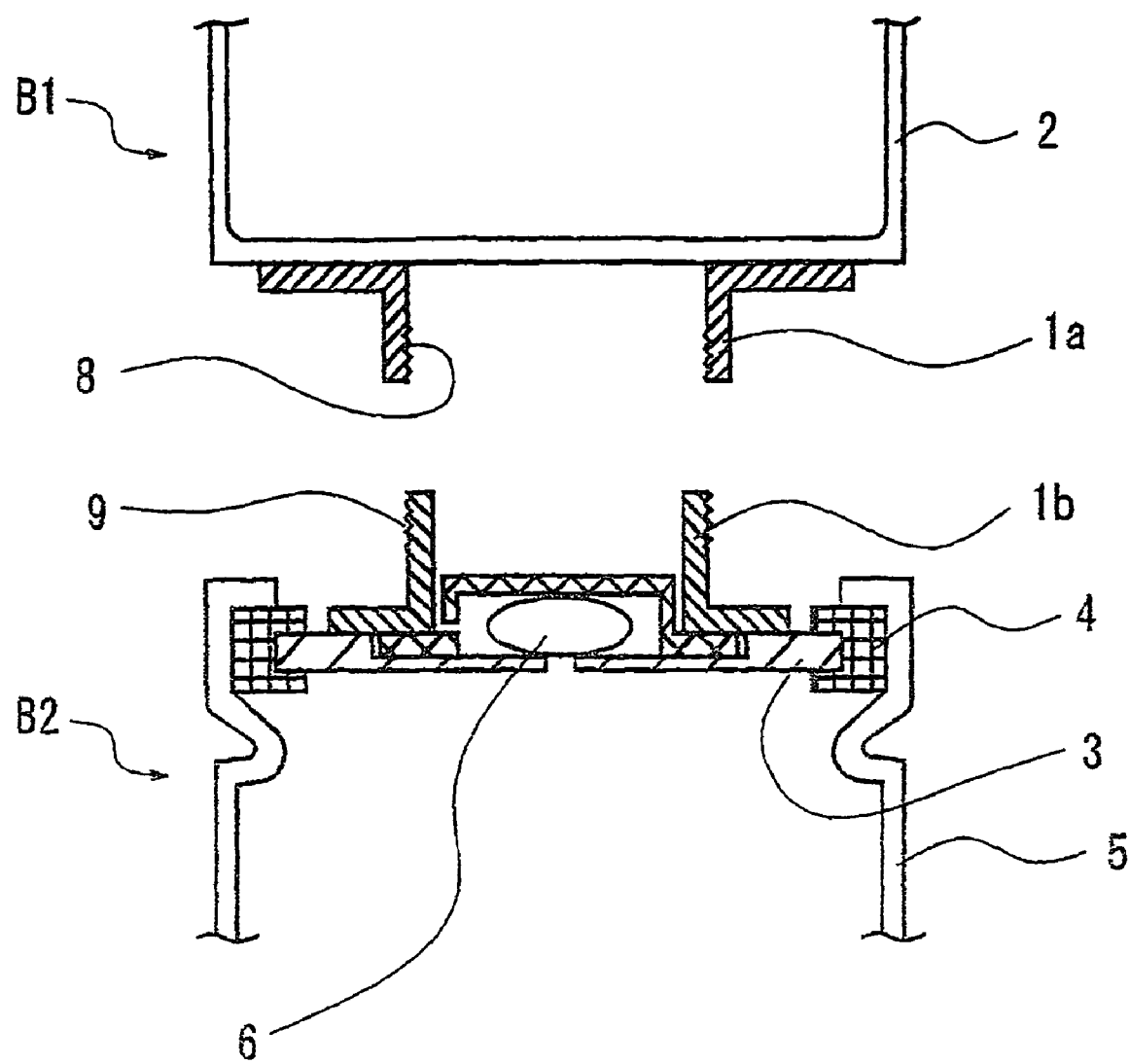

[FIG.5]
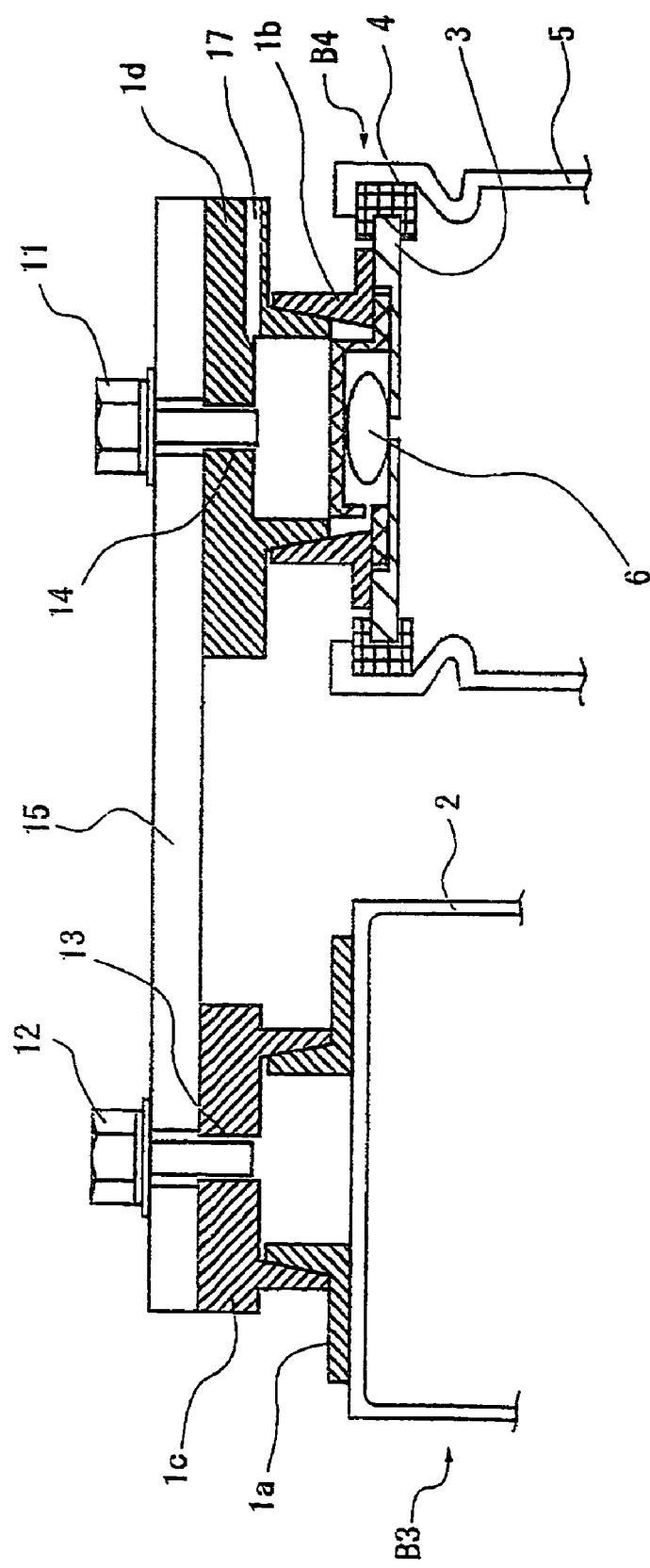

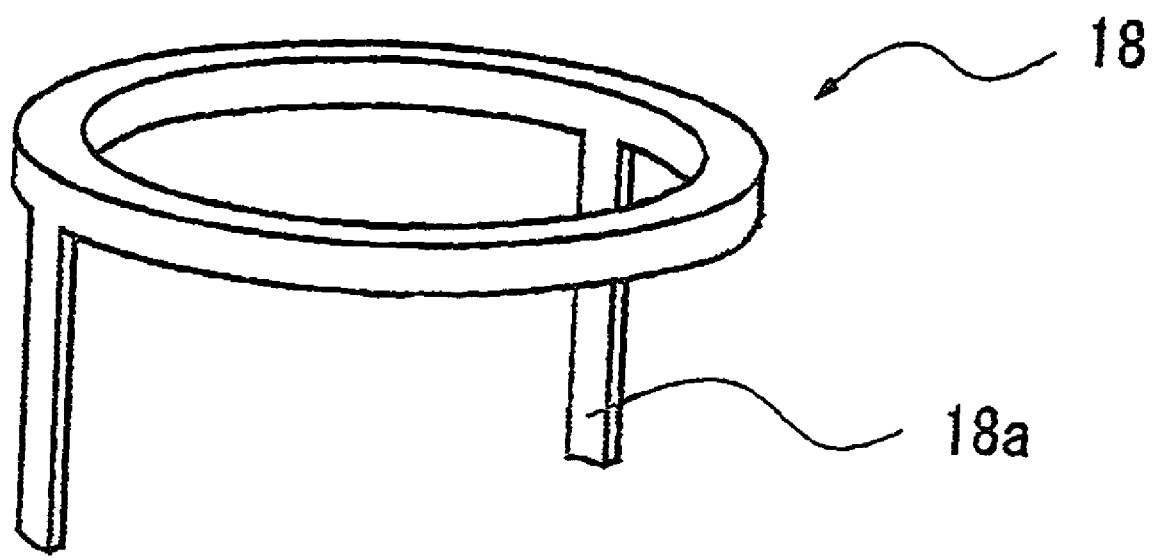
[FIG.6]

CONNECTION STRUCTURE BETWEEN UNIT CELLS

The description of this application claims benefit of priority based on Japanese Patent Application No. 2005-375524, the entire same contents of which are incorporated by reference herein.

BACKGROUND OF THE INVENTION

1. Field of the Invention

The present invention relates to the connection structure which composes module batteries in which a plurality of cylindrical batteries are connected in series, and in particular, the present invention relates to the connection structure between unit cells in which electrical resistance between unit cells are greatly reduced and mechanical strength is improved.

2. Description of the Prior Art

From the past, in forming storage battery modules for obtaining desired output voltage by connecting a plurality of unit cells in series, metal foil junctions for connecting between unit cells have been used. In generally used batteries, a metal case also acts as a negative terminal of the battery, and an aperture portion of the metal case is sealed by a sealing plate (or cap) which is a positive electrode terminal interposing an electrically insulating resin gasket therebetween. As a way to electrically connecting the two unit cells, the method of connecting the positive terminal of one unit cell and the negative terminal of another unit cell by spot welding interposing a connection body of a metal plate therebetween has been used up to the present.

Spot welding can easily be conducted when two metal plates are connected in thickness direction. However, when the aforementioned unit cells are welded, in principal, welding in thickness direction becomes difficult since a metal plate and a battery terminal of an opposite end is electrically insulated. Therefore, such a welding method has been employed in which a welding current is applied bringing two welding rods closer and heating the metal plate until it is fused, thereby welding the metal plate to the battery terminal. With this method, temperature must be risen to weld the metal plate, and when thickness of the metal plate connected is thick, it is very difficult to surely weld the metal plate and even when the metal plate should be welded, due to welding current, the temperature rise in unit cells becomes great, causing deterioration in electrical characteristics.

This method is widely used since less heat is generated and welding can be easily conducted, and no problem occurs when relatively little current is used in the limited case where a connector is made of a thin plate (not greater than about 300 μm thick). However, for the use where large current discharge is desired the problem of which lies in the electrical resistance between unit cells, when the aforementioned spot welding method is employed, the distance between welded spots becomes large and as a result of increased electrical resistance, decrease in discharge voltage and in output characteristics are caused. Further, since mechanical strength at the connecting portion is weak, for the automobile use the problem of which lies in vibrations, some measures need to be taken for improving the mechanical strength.

From such backgrounds, batteries in Japanese Patent Laid-Open Publications No. Hei 10-106533 (Patent document 1) and No. 2000-149907 (Patent document 2) disclose projection welding method. Both methods provide projections at portions contacting in a plane thereby intensively loading welding current.

SUMMARY OF THE INVENTION

Both of patent documents 1 and 2 disclose methods of welding between unit cells after completing the unit cells. In order to lower the electrical resistance and improve the mechanical strength, firm welding of a connection body is required by increasing the welding current. Further, there still remains a problem that unless the positions to which a current is applied have substantially the same thickness, firm welding cannot be made in the case where a connection body which is required for connecting unit cells and the sealing plates of the unit cells are welded or in the case where the battery case and the connection body are welded. In other words, by making welded portions of a sealing plate of a battery, welded portions of a battery case and welded portion of the connection body have substantially the same thickness, firm welding is available. Therefore, there lies a problem of inability for firm welding when a thick material with reduced electrical resistance is used only for the connection body.

Further, although improving the firm welding by increasing the welding current is easily assumed, the increased welding current causes the heat at the welding portion to rise, and the temperature in the batteries inevitably rises due to thermal conduction. When the temperature rise in the batteries occurs, deformation of a rubber valve which releases gas outside when the internal gas pressure in the batteries abnormally rises or deformation of a gasket which tightly closes the batteries from outside occurs. Since these things become the causes for lowering the electrical characteristics, there is a limit of merely increasing welding current for the purpose of the firm welding.

Therefore, the present invention has found that such a connection structure capable of greatly reducing the electrical resistance is required as a result of firm welding without badly affecting said electrical characteristics accompanying temperature rise at the time of welding nevertheless, capable of welding with a connection body for connecting unit cells, in particular, with a thick material with decreased electrical resistance.

In addition, since such kinds of batteries require large-current in charging and discharging, the temperature rise during the operation becomes great. In considering the heat resistance or electrical characteristics of the materials generally used for batteries, battery temperature is desirably set in the vicinity of a room temperature, therefore, when the heat reaches high temperature, some cooling methods are required to take. However, since one of the prior arts Patent document 1 employs the method of shortening the distance between unit cells as much as possible in order to lower the electrical resistance between the unit cells, another structure by which discharge effect from the connecting unit cells can be expected is required.

The present invention relates to a connection structure between unit cells connecting a plurality of batteries in series with bottomed cylindrical battery cases which function as electrode terminals on one side, sealing plates which close the opening portions of the battery cases which function as electrode terminals on another side, wherein the first ring made of a metal having a flange is jointed at a bottom portion of a battery case of one battery in a conductive manner, the second ring made of a metal having a flange is jointed at an upper portion of a sealing plate of another battery in a conductive manner, and said first ring made of a metal and said second ring made of a metal are fitted.

The present invention also relates to a connection structure between unit cells connecting a plurality of batteries in series with bottomed cylindrical battery cases which function as electrode terminals on one side, sealing plates which close the opening portions of the battery cases which function as electrode terminals on another side, wherein the first ring made of a metal having a flange is jointed at a bottom portion of a battery case of one battery in a conductive manner, the second ring made of a metal having a flange is jointed at an upper portion of a sealing plate of another battery in a conductive manner, and a screw groove is formed in an outer side surface of a cylindrical portion of one of said first ring made of a metal and said second ring made of a metal and an inner side surface of a cylindrical portion of another of said first ring made of a metal and said second ring made of a metal, and said first and said second rings made of a metal are screw fitted.

At the time of welding the ring made of a metal for connecting unit cells, temperature rise is accompanied, however, before manufacturing the battery, the ring made of a metal is welded to a battery case and a sealing plate. As a result, a method of firm welding can be provided without causing any bad effect on said battery characteristics as mentioned above.

The present invention relates to the connection structure between unit cells, wherein a ventilating groove which ventilates to atmospheric air is provided on a jointed surface of at least one flange of said first ring made of a metal and said second ring made of a metal.

In the connection structure between the unit cells of the present invention, a sealing plate is enclosed by the ring made of a metal. However, by providing a connecting groove connective to atmospheric air on a jointed surface of a flange inside of the ring, even when the inner pressure rises, the pressure can be relieved.

The present invention relates to the connection structure between unit cells, wherein said first ring made of a metal and said second ring made of a metal are welded and the welding means laser welding here. Further, the present invention relates to the connection structure between unit cells, wherein a distance between a flange of said first ring made of a metal and a flange of said second ring made of a metal is not less than 3 mm, fixture is available at more than two portions between connected unit cells, and an insulating resin fixing frame for air flow is provided.

Further, in the structure of the present invention, laser welding is available which has little thermal conduction to the surroundings for the purpose of increasing mechanical strength and reducing electrical resistance at a connecting portion after fixing the ring made of a metal by fitting or screw fitting.

Compared with a conventional connection structure, the connection structure between unit cells according to the present invention can elongate the distance of adjacent batteries since larger mechanical strength can be obtained by the latter structure. As a result, radiation effect between unit cells can be expected thereby inhibiting the temperature rise which is a cause of lowering the battery characteristics.

The present invention relates to a manufacturing method of unit cells, comprising of jointing the first ring made of a metal having a flange to a bottom portion of a battery case of one battery in a conductive manner, and/or jointing the second ring made of a metal having a flange to an upper portion of a sealing plate of another battery in a conductive manner, and inserting generating element which includes electrodes, a separator, an electrolyte, connecting said electrodes to said battery case and said sealing plate electrically and closing the opening portion of said battery case with said sealing plate.

Conventionally, unit cells are connected electrically in a state of sealing batteries after inserting generating element in a battery case. On the other hand, in the structure of the present invention, the ring made of a metal having a flange is welded to the bottomed cylindrical case or to the sealing plate before inserting an electrode and a separator which is generating element in a bottomed cylindrical case. By this structure, since there is no separator or gasket made of a synthetic resin whose heat resistance is relatively low compared with a metal at the time of welding, welding output can be improved thereby obtaining firm welding. As a result, mechanical strength at a welding portion can be strengthened and it can be said that this is an effective method for the use which accompanies mobility and vibration.

The present invention has a structure of connecting unit cells with a ring made of a metal having a flange and compared with conventional connection structures, even when the distance between unit cells is elongated, the electrical resistance at a connecting portion does not increase. This structure allows to employ a welding method such as laser welding with high output density without contacting with a welding portion in welding between unit cells. Further, since welding with high output density is available, welding strength can be improved and welded portions can be concentrated, thereby capable of inhibiting the temperature rise around the welding portion.

In the conventional connecting methods between unit cells, when welding failure occurs, failure occurs on at least two batteries, however, according to the present invention, failure occurs as parts of a battery. When the rate of defective welding is the same, the loss of money for defect becomes less and therefore it is valuable from the industrial view point.

BRIEF DESCRIPTION OF THE DRAWINGS

FIG. 1 is a schematic cross-sectional view showing a state before connecting two unit cells of the present invention.

FIG. 2 is an oblique view showing the first and the second rings made of a metal with a flange.

FIG. 4 is a schematic cross-sectional view showing a state before connecting two unit cells by a screw fitting.

FIG. 5 is a schematic cross-sectional view showing the connection structure of adjacent unit cells.

FIG. 6 is an oblique view showing a fixed frame.

DETAILED DESCRIPTION OF THE PREFERRED EMBODIMENT

Figure 3A:
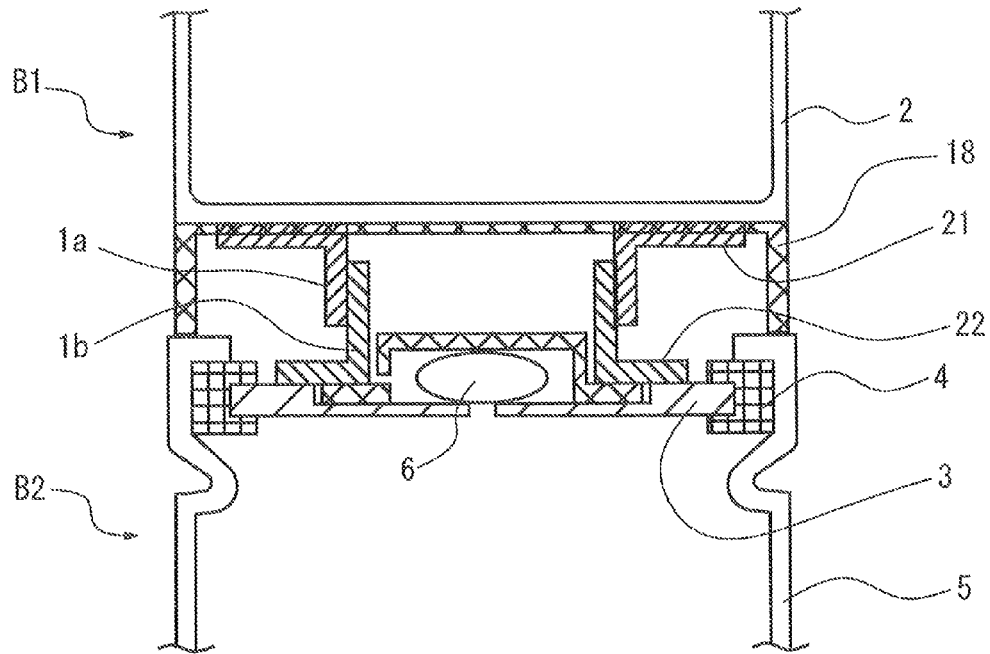
FIG. 3a is a schematic cross-sectional view showing the connecting state of the connection structure between unit cells of the present invention.

Hereinafter, referring to the attached drawings, one embodiment of the present invention is explained. FIG. 1 is a schematic cross-sectional view showing a state before connecting two unit cells of the present invention. In a battery B1 shown in the upper portion, the first ring made of a metal 1a having a flange is jointed at the bottom surface of a bottomed cylindrical case 2 together in a conductive manner beforehand. In a battery B2 shown in the lower portion, the second ring made of a metal 1b having a flange is jointed in the upper portion of the sealing plate 3 together in a conductive manner beforehand. Junction is preferably made for example, by welding.

The sealing plate 3 and the second ring made of a metal 1b jointed together and integrated tightly close the battery interposing a gasket 4 therebetween. In the drawing, an inner diameter of the first ring made of a metal 1a and an outer diameter of the second ring made of a metal 1b are designed to have substantially the same size. Designed as such, the first ring made of a metal 1a and the second ring made of a metal 1b can be fitted with no space therebetween. Composed as such, a unit cell B1 and a unit cell B2 can be connected electrically and mechanically. In addition, by sandwiching a metal foil 25 for fitting in the gap between the first ring made of a metal 1a and the second ring made of a metal 1b, electrical resistance can further be inhibited. Materials for metal foils are preferably aluminum (Al), copper (Cu), nickel (Ni), or alloys whose main materials are aluminum (Al), copper (Cu), and nickel (Ni).

Even when metal foils are fitted without gap, lowering in mechanical strength and increase in contact resistance caused by looseness in fitting portion are not assumed to be a big problem in a fixed state or charge and discharge at low current. However, for the mobile uses like automobile uses, since vibration inevitably occurs, there is high risk that the loosening at the fitting portion occurs. It is assumed this causes the problem of lowering in mechanical strength and increase in contact resistance, thereby causing some trouble at the time of using batteries. Therefore, preferably in a fitted state, by laser welding on four or six points at an interval of 90° or 60° in the outer periphery of a cylindrical portion of a ring made by a metal, for example, mechanical strength in the fitting portion can be improved and the electrical resistance can be lowered. Since the present invention enables the application of laser welding or arc welding, a structure which can enhance contact strength can be realized. When welded and jointed by this method, compared with the resistance at a jointed portion subject to simple fitting, lowering in the electrical resistance by 0.2 to 0.3 mΩ which is an actual measurement value was acknowledged. For example, regarding the batteries used for hybrid electrical vehicles, the current sometimes reaches as high as 150 A, though instantaneously. When used with such a large amount of current, the lowering of battery voltage by 30 to 45 mV can be calculated from said electrical resistance value, and therefore, lowering the electrical resistance at the connecting portion as disclosed in the present invention becomes the important factor for the batteries for hybrid electric vehicles.

FIG. 2 shows the oblique view showing the first ring made of a metal 1a and the second ring made of a metal 1b and it was made clear that the fitting portion should have a cylindrical shape and its thickness should be not less than 1.5 mm considering the strength and the electrical resistance when fitted, and desirably, 2 to 3 mm, and that the lower limit of the thickness should be within the aforementioned range. Increasing the lower limit over the aforementioned range further improves strength and electrical resistance, however, the battery weight increases and high output is required for welding the fitting portion mentioned later and considering the bad effect caused by the temperature rise at the time of welding, as thickness of cylindrical portion, said designated range is appropriate.

In the present invention, since it is desirable to secure satisfactory fitting strength and to weld the fitting portion by laser, it is necessary to set the length of the cylindrical portions 21 and 22 of the rings made of metal 1a and 1b not less than the predetermined value.

From such a viewpoint, as a result of acknowledging the relationship between the length of cylindrical portions 21 and 22 and the strength in the fitting portion, and acknowledging whether or not it can actually be laser welded, it was found that the length should be at least 3 mm. Therefore, it can be acknowledged that the pipe portion of the flange connection body inevitably has the length of not less than 3 mm. However, to unnecessarily elongate the length causes the increase in electrical resistance at the connecting portion, and therefore, there is a reasonable upper limit. By this structure, the heating of the battery mentioned later can be inhibited.

The thickness of flanges 23 and 24 of rings made of metal 1a and 1b which directly contact with the bottomed cylindrical battery case 2 which is also one electrode terminal or the sealing plate 3 which is also another electrode terminal at the time of integration by a spot welding is found to be effective for improvement in welding strength when said thickness is around 0.5 mm. Since this thickness is substantially the same as that of the material which composes a bottomed cylindrical battery case 2 and the sealing plate 3, it is desirable that the thickness of the flanges 23 and 24 is set to be substantially the same as that of the welded portion for securing the welding strength. Therefore, since the optimum value varies depending on the parts which compose the battery, the thickness of flanges 23 and 24 should be set based on the thickness of the bottomed cylindrical battery case 2 and the sealing plate 3.

Further, in the present invention, welding is available not only by the spot welding but also by the so-called inverter welding method using an inverter DC power source. In this case, stronger welding is available since structure of intensively applying a current to the protruded portion provided on the same radius of the welded surface of flanges 23 and 24 becomes available.

The explanation was made when an inner diameter of the first ring made of a metal 1a and an outer diameter of the second ring made of a metal 1b have the specific size at the fitting portion. However, not limited to such an embodiment, by making the inner diameter of the tip end of the fitting portion of the first ring made of a metal 1a large, and by making the inner diameter of the portion which is near to the flange 23 small, and by making the tip end portion of the outer diameter of the corresponding second ring made of a metal 1b small and by making the outer diameter of the portion which is near to the flange 24 large, firm fixture is available and effective. Of course, the structure in which the second ring made of a metal 1b is fitted outside of the first ring made of a metal 1a may be employed.

As mentioned above, by the structure of the present invention, as remarkable characteristics different from the prior arts, the first ring made of a metal 1a can be directly welded in a bottomed cylindrical case 2 in the step before a power generating element and electrolyte are contained in the battery case 2. Likewise, the second ring made of a metal 1b can be welded in a sealing plate 3. In other words, before assembling metal connection bodies as a battery, they can be manufactured as parts and compared with prior arts, the welding part can be made firm. As a result, the reduction in the electrical resistance can be expected and since the welding strength between the first ring made of a metal 1a and the bottomed cylindrical case 2 and the welding strength between the second ring made of a metal 1b and the sealing plate 3 are improved.

Next, in FIG. 2, a ventilating groove 7 is hereby explained. Generally, in this kind of a battery, a rubber valve 6 shown in FIG. 1 is internally fitted in the sealing plate 3. When the pressure in the cell abnormally rises, the rubber valve 6 is deformed and the gas is exhausted from the inside. However, in the present invention, by the fitting of the first ring made of a metal 1a and the second ring made of a metal 1b, since inside of the rings 1a and 1b become air-tight, the gas generated at the time of abnormality cannot be emitted. Therefore, it is preferable that the ventilating groove 7 which can exhaust the gas outside is formed at least on one jointed surface of flanges 23 and 24.

Figure 3B:
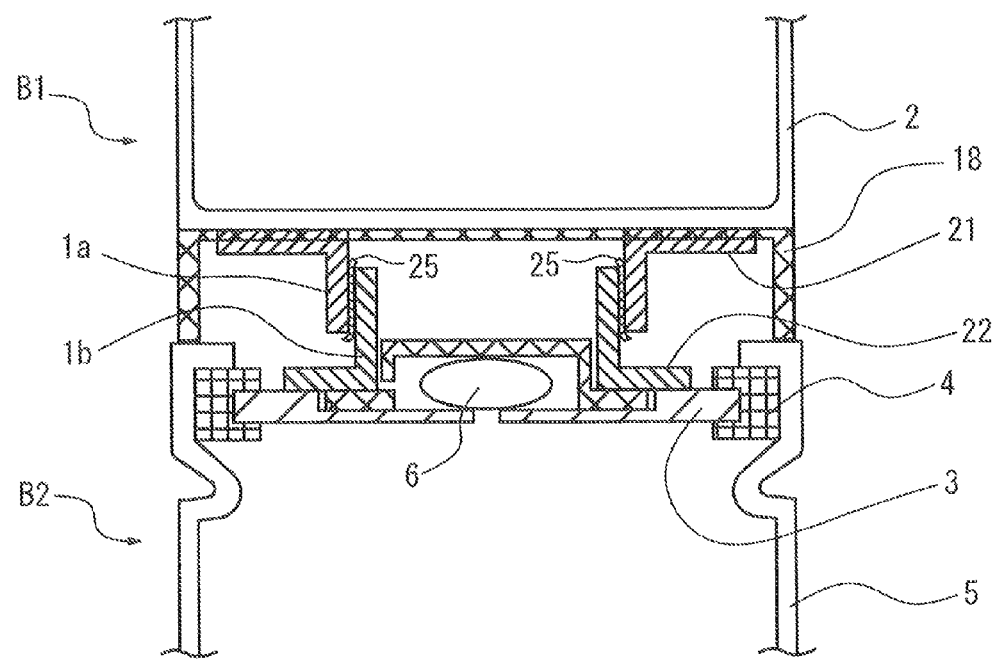
FIG. 3b is a schematic cross-sectional view showing the connecting state of the connection structure between unit cells of the present invention with a metal foil sandwiched between the first ring and the second ring.

Compared with the conventional art, in the present invention, by thickening the thickness of the cylindrical portions 21 and 22 of the first ring made of a metal 1*a* and the second ring made of a metal 1*b*, electrical resistance can be lowered. As a result, in the fitted state as shown in FIGS. 3*a* and 3*b*, even when the distance A between flanges 23 and 24 is elongated, the ratio of the increase in electrical resistance becomes less. From this, as mentioned above, the laser welding is applicable to the fitting portion and further, since the structure in which at least one portion of the first ring made of a metal 1*a* and the second ring made of a metal 1*b* can be exposed is available, function with excellent heat radiation performance can be added. Therefore, in the battery system accompanied by temperature rise by charge and discharge, the rise in temperature can be inhibited. In addition, by inserting the fixing frame 18 between unit cells, mechanical strength against bending of module batteries can be improved. Here, when the fixing frame 18 covers all the spaces between unit cells, fitting portions or screw fitting portions cannot be welded thereby lowering the heat radiation performance. Therefore, as shown in FIG. 6, it is preferable that the fixing frame 18 is provided with the supporting portion 18*a* which can support on two portions or more thereby enabling welding of jointed portions or screw fitting portions and ventilating air.

Currently used nickel and hydrogen batteries deteriorate their battery characteristics such as lowering in charge and discharge efficiency, lowering in the cycle life, and the like by the rise in battery temperature. In the present invention, as mentioned before, since the battery structure with excellent heat radiation performance can be achieved, it is anticipated that the deterioration in battery characteristics can be inhibited in the battery system in which bad effect is concerned by the temperature rise. In addition, as shown in FIGS. 3*a* and 3*b*, although explanation was made on the structure capable of fitting the first ring made of a metal 1*a* and the second ring made of a metal 1*b*, another structure is also available in which a screw groove (female screw) 8 is formed inside of a cylindrical portion of the first ring made of a metal 1*a* and a screw groove (male screw) 9 corresponding to the outside of a cylindrical portion of the second ring made of a metal 1*b*, thereby connecting the first ring made of a metal 1*a* and the second ring made of a metal 1*b* with a screw fitting as shown in FIG. 4.

In FIG. 4, in the case of providing screw grooves 8 and 9 respectively in a ring made of a metal 1*a* and a ring made of a metal 1*b*, as in the case of the above mentioned fitting method, firm fixture by applying laser welding or arc welding to a screw fitting portion after connecting by a screw fit is available and the structure with an exposed connecting portion is also available. Further, when connected by a fitting method or screw fitting method, by fixing with fitting or screw fitting interposing a metal foil (not illustrated) between the first ring made of a metal 1*a* and the second ring made of a metal 1*b*, the strength is further improved. As materials for metal foils, aluminum (Al), copper (Cu), nickel (Ni), or alloys whose main materials are aluminum (Al), copper (Cu), or nickel (Ni) are preferable.

Heretofore, regarding the embodiment of the invention, the explanation has been made on a method for connecting unit cells in a linear manner. In order to obtain desired voltage, connecting a plurality of batteries in series in a state of being bent by 180 degrees is also required. In this case, as shown in FIG. 5, in a state where the first ring made of a metal 1*a* and the second ring made of a metal 1*b* used at the time of linear connection are fixed to the battery, further, the first connector made of a metal 1*c* and the second connector made of a metal 1*d* are fitted or screw fitted respectively. Since screw pores 13 and 14 are provided at the center of the first and the second connectors made of a metal 1*c* and 1*d* and are connected in a conductive manner by a connecting plate 15 and bolts 11 and 12, electrical and mechanical fixture is available. In addition, in order to avoid a closed state, a ventilating pore 17 is preferably provided on the second connector made of a metal 1 d to be fitted and screw fitted in the side with a sealing plate 3.

EXAMPLE

Regarding the connection structure between batteries related to the present invention, electrical resistance at the connecting portion was measured. Batteries to be measured are D sized batteries (cylindrical sealed batteries with an outer diameter of 17 mm and a height of 56 mm by the single size). As shown in FIG. 2, the first ring made of a metal 1*a* was welded to a sealing plate 3 which is a positive electrode terminal. The thickness of a flange 23 of the first ring made of a metal 1*a* used here was 0.5 mm, and the outer diameter was 23 mm, the outer diameter of a cylindrical portion 21 was 17 mm, and the inner diameter was 13.8 mm. The second ring made of a metal 1*b* was welded to a bottom portion of a battery case 2 which is a negative electrode terminal. The thickness of a flange 24 of the second ring made of a metal 1*b* was 0.5 mm, and the outer diameter was 20 mm, and the outer diameter of a cylindrical portion 22 was 13.7 mm, and the inner diameter of was 10 mm.

A connection system, the presence or absence of copper foils and of laser welding are as shown in the table 1. As a metal foil used for lowering the electrical resistance of a fitting portion and a screw fitting portion, a copper foil with a thickness of 20 μm was used. In addition, using a laser welder (manufactured by MIYACHI CORPORATION: type ML-2550A), irradiation was applied for 0.1 second with an irradiating diameter of 0.6 mm and with an output of 5.4 kW. When connected by screw fitting, a female screw of M16 is formed in an inner side surface of a cylindrical portion of the first ring made of a metal 1*a* and a male screw of M16 is formed in an outer side surface of a cylindrical portion of the second ring made of a metal 1*b*.

TABLE 1

Result of measurement of electrical resistance of a connection method and of a connection portion

| Connection system | The presence of copper foil at a connecting portion | Laser welding Yes or No | Number of laser points | Electrical resistance at the connecting portion (mΩ) |
|---|---|---|---|---|
| Fitting method | Present | No | — | 1.31 |
| | Not present | — | — | 0.81 |
| | Not present | Yes | 4 | 0.56 |
| | | | 6 | 0.51 |
| | | | 8 | 0.49 |
| Screw fitting method | Not present | No | — | 1.55 |
| | Present | — | — | 0.82 |
| | Not present | Yes | 4 | 0.58 |
| | | | 6 | 0.52 |
| | | | 8 | 0.50 |

From the result of measurement of electrical resistance in Table 1, it was found that contact resistance can be reduced by interposing a copper foil at a jointed portion. In addition, by welding with a laser, it was found that the effect is even more remarkable. By increasing the number of the points of laser welding, the contact resistance was reduced, however, when the number of the points are unnecessarily increased, there is a concern that mechanical strength might be lowered, and therefore, 6 to 8 points are considered to be the most appropriate.

The value of resistance when simply fitted or screw fitted was 1.31 to 1.55 mΩ. This value has no bad effect from the practical view point judging from that the voltage decreases by 65.5 to 77.5 mV when 50 A of current is applied by a nickel cadmium battery or nickel hydroxide battery practically used as a battery for large current and that the operation voltage of the battery is 1.2 V, the voltage decreases by more than 5%.

What is claimed is:

1. A connection structure between unit cells connecting a plurality of batteries in series, the batteries having bottomed cylindrical battery cases, which function as electrode terminals on one side, and sealing plates, which close the opening portions of the battery cases and which function as electrode terminals on another side, wherein a first ring having a flange is jointed at a bottom portion of the battery case of one battery in a conductive manner and a second ring having a flange is jointed at an upper portion of the sealing plate of an adjacent battery in a conductive manner, wherein said first ring and said second ring are fitted together, and wherein a ventilating groove or a ventilating pore, which ventilates to atmospheric air, is provided on a jointed surface of at least one flange of said first ring and said second ring.

2. The connection structure between unit cells as set forth in claim 1, wherein there is the ventilating groove.

3. The connection structure between unit cells as set forth in claim 1, wherein said first ring and said second ring are made of a metal and are welded to be jointed to the bottom portion of the battery case and the upper portion of the sealing plate, respectively.

4. The connection structure between unit cells as set forth in claim 3, wherein said welding is laser welding.

5. The connection structure between unit cells as set forth in claim 1, wherein a distance between a flange of said first ring and a flange of said second ring is not less than 3 mm and a fixing frame is available at more than two portions around the connected unit cells to keep the distance for air flow.

6. The connection structure between unit cells as set forth in claim 1, wherein a part or a whole of said first ring and said second ring are exposed outward under a state of connecting unit cells.

7. The connection structure between unit cells as set forth in claim 1, wherein said first ring and said second ring are fitted or screw fitted interposing a metal foil.

8. The connection structure between unit cells as set forth in claim 7, wherein the materials of said metal foil are aluminum (Al), copper (Cu), nickel (Ni), or alloys whose main materials are aluminum (Al), copper (Cu), or nickel (Ni).

9. A connection structure between unit cells connecting a plurality of batteries in series, the batteries having bottomed cylindrical battery cases, which function as electrode terminals on one side, and sealing plates, which close the opening portions of the battery cases and which function as electrode terminals on another side, wherein a first ring having a flange is jointed at a bottom portion of the battery case of one battery in a conductive manner, a second ring having a flange is jointed at an upper portion of the sealing plate of another battery in a conductive manner, and a screw groove is formed in an outer side surface of a cylindrical portion of one of said first ring and said second ring and in an inner side surface of a cylindrical portion of another of said first ring and said second ring, and wherein said first and said second rings are screw fitted, and wherein a ventilating groove or a ventilating pore, which ventilates to atmospheric air, is provided on a jointed surface of at least one flange of said first ring and said second ring.

10. The connection structure between unit cells as set forth in claim 9, wherein there is the ventilating groove.

11. The connection structure between unit cells as set forth in claim 9, wherein said first ring and said second ring are welded to be jointed to the bottom portion of the battery case and the upper portion of the sealing plate, respectively.

12. The connection structure between unit cells as set forth in claim 11, wherein said welding is laser welding.

13. The connection structure between unit cells as set forth in claim 9, wherein a distance between a flange of said first ring and a flange of said second ring is not less than 3 mm and a fixing frame is available at more than two portions around the connected unit cells to keep the distance for air flow.

14. The connection structure between unit cells as set forth in claim 9, wherein a part or a whole of said first ring and said second ring are exposed outward under a state of connecting unit cells.

15. The connection structure between unit cells as set forth in claim 9, wherein said first ring and said second ring are screw fitted interposing a metal foil.

16. The connection structure between unit cells as set forth in claim 15, wherein the materials of said metal foil are aluminum (Al), copper (Cu), nickel (Ni), or alloys whose main materials are aluminum (Al), copper (Cu), or nickel (Ni).

* * * * *

UNITED STATES PATENT AND TRADEMARK OFFICE
CERTIFICATE OF CORRECTION

| | | |
|---|---|---|
| PATENT NO. | : 7,887,947 B2 | Page 1 of 1 |
| APPLICATION NO. | : 11/645784 | |
| DATED | : February 15, 2011 | |
| INVENTOR(S) | : Kawano et al. | |

It is certified that error appears in the above-identified patent and that said Letters Patent is hereby corrected as shown below:

Face of the Patent, See Item (75) Inventors: lines 2-3, "Keisuke Aoki, Osaki (JP)"
should read -- Keisuke Aoki, Osak<u>a</u> (JP) --

Signed and Sealed this

Seventeenth Day of May, 2011

David J. Kappos
*Director of the United States Patent and Trademark Office*